United States Patent [19]

Schmidt et al.

[11] Patent Number: 4,901,347
[45] Date of Patent: Feb. 13, 1990

[54] CIRCUIT ARRANGEMENT FOR TELECOMMUNICATION SWITCHING SYSTEMS, PARTICULARLY PCM-TIME-DIVISION MULTIPLEX TELEPHONE SWITCHING SYSTEMS WITH A CENTRAL MATRIX AND WITH LOCAL SUB-SWITCHING MATRICES CONNECTED TO THE SAME

[75] Inventors: Lothar Schmidt, Fuerstenfeldbruck; Klaus Eberlein, Wolfratschausen; Gerhard Schaich, Munich; Fritz Hlawa, Deisenhofen, all of Fed. Rep. of Germany

[73] Assignee: Siemens Aktiengesellschaft, Berlin and Munich, Fed. Rep. of Germany

[21] Appl. No.: 197,533

[22] Filed: May 23, 1988

[30] Foreign Application Priority Data

May 22, 1987 [DE] Fed. Rep. of Germany ....... 3717387

[51] Int. Cl.⁴ ............................................. H04Q 11/04
[52] U.S. Cl. ..................................... 379/279; 379/273
[58] Field of Search ............... 379/273, 279, 268, 242; 370/58

[56] References Cited

U.S. PATENT DOCUMENTS 4,499,461  2/1985  Schneider ....................... 340/825.03
4,626,625  12/1986  Daisenberger .................. 379/279 X
4,754,480  6/1988  Mattis et al. ........................ 379/279

FOREIGN PATENT DOCUMENTS 0058750  7/1985  European Pat. Off. .

OTHER PUBLICATIONS

Telcom Report, "Digital Communication with EWSD", (1981), Special Issue, K. J. Frensch.

Primary Examiner—James L. Dwyer
Attorney, Agent, or Firm—Adel A. Ahmed

[57] ABSTRACT

A circuit arrangement for telecommunication switching systems, including PCM time division multiplex telephone switching systems, with double central switching matrix by which two corresponding line trunk groups comprising a sub-switching matrix each and a group control unit each, are allocated to each other in pairs via two time-division-multiplex lines. The line units and the PCM-lines leading to the central switching matrix, which are individually respectively allocated to the two line trunk groups, and which are connected with the respective sub-switching matrix of their own line trunk group during normal service, are switchable, during emergency service of one of the two line trunk groups, to the sub-switching matrix of the respective other line trunk group. In order that no calls already interconnected via the line units of the affected line trunk group up to the time of the switch-over are interrupted, each local control unit transmits all call data of interconnected calls to its associated control unit while still in normal service, on which basis the appertaining calls are securely interconnected within the sub-switching matrix of the associated line trunk group.

12 Claims, 3 Drawing Sheets

CIRCUIT ARRANGEMENT FOR TELECOMMUNICATION SWITCHING SYSTEMS, PARTICULARLY PCM-TIME-DIVISION MULTIPLEX TELEPHONE SWITCHING SYSTEMS WITH A CENTRAL MATRIX AND WITH LOCAL SUB-SWITCHING MATRICES CONNECTED TO THE SAME

PCM-telephone switching systems are already known in the art, through the Journal ("telecom report") Volume 4, 1981, Supplement "Digital Switching Systems EWSD", particularly through the article beginning on Page 19, which are equipped with a multistage central switching matrix, exhibiting time-division multiplex inputs and time-division multiplex outputs, and with a central processor, as well as with a number of line trunk groups serving the connection of time-division multiplex trunk lines each of which is connected to a time-division multiplex input and a time-division multiplex output of the switching matrix and each of which exhibits a multiplicity of line units, serving for the connection of a time-division multiplex trunk line, which themselves are connected to the time-division multiplex matrix unit belonging to the appertaining line trunk group and are connectable via these with channels of the corresponding time-division multiplex input and the corresponding time-division multiplex output of the switching matrix.

In telephone switching systems of this type, time-division multiplex trunk lines always include a large number, for example, twenty four, thirty, sixty or even more channel pairs. A channel pair always encompasses a channel in the one transmission direction and a channel in the other transmission direction. One channel pair is required per connection (apart from so-called multi-channel connections). As shown in the Figure of the noted Journal, a large number of line trunk groups per telephone switching center are provided with a double switching matrix for reasons of reliability. Each line trunk group encompasses a multiplicity of line units. There are line units of various types depending on the specific type of the connected lines. Subscriber lines, as a rule, are analog lines but may also make use of PCM-technology. Trunk lines may be likewise be analog lines. They may, however, also be in the form of PCM-channels which are combined with a time division multiplex line, respectively, in PCM-transmission systems in a manner understood in the art. The line trunk groups noted are established in various ways and respectively correspond to the appertaining technology of the subscriber and trunk lines to be connected, and depending on whether analog technology or time division multiplex technology is employed. As a rule, a line adapter is provided for a multiplicity, for example, eight, analog subscriber lines. Likewise, a line unit is provided for a multiplicity of analog trunk lines. As a rule, an individual line adapter is provided per time-division multiplex trunk line of PCM-transmission system. It would likewise be possible however, to connect more than one time-division multiplex trunk line of a PCM-time division multiplex system to one line adapter, for example two time-division multiplex lines.

Through the natural combination of the number of channels noted in the above example, respectively, in a single PCM-transmission system, their allocation is, of course, conditioned to a single traffic route, for the appertaining channels must evidently run the same course as does the time-division multiplex line of this PCM-transmission system. Likewise, since on the basis of this combination, the connection of a time-division multiplex line of a PCM transmission system to a line unit of necessity requires the allocation of the appertaining channels to a single line unit and therefore to a single line trunk group, it follows that for the case where only the channels (channel pairs) of a single PCM-transmission system are prepared, that upon the failure of a line trunk group, all call capabilities in the appertaining traffic route will fail, that is, in terms of the switching system technology, an entire route destination cable.

In order to avoid the effect of total failure of a route destination cable explained above due to the failure of a line trunk group alone, provision is made, in cases understood in the art, for providing two independent PCM-transmission systems per traffic route for connecting the time-division multiplex lines of these transmission systems to line units of two different line trunk groups. This is costly and un-economical particularly in the case of small trunk line routes because of the duplication of PCM-transmission systems.

In order to avoid having to provide a doubling of a PCM-transmission system per traffic route, in a circuit arrangement of the type noted in the preamble, in view of the possibility of a failure of a line trunk group and therefore avoid a situation in which an entire trunk line route, i.e. the channel pairs of the appertaining PCM-transmission system, may and/or must fail due to the failure of a line trunk group alone, it has already been proposed, that for telephone switching systems of the type known in the art and noted in the preamble, two line trunk groups be allocated to each other respectively, whereby further provision is made so that the line adapters of each of these two line trunk groups, which are connected to the time division multiplex matrix unit of their own line trunk group in normal service, be switchable to the time-division multiplex matrix of the respective other line trunk group during emergency service.

In the known case, this allows a PCM transmission system with its channels to remain in service upon the failure of the appertaining line trunk group. Thus in this case, a double number of channels (channel pairs) is switched over a line trunk group, i.e. of the respective other of the two line trunk groups allocated to each other in pairs. This leads to an especially great traffic-related load of the appertaining line trunk group and an increase in trunk busy state cases; however, all connections being established over the appertaining channels have an equal chance of being successful. It may also happen thereby that a multiplicity of traffic routes can only be operated at half traffic load. However, connections in all traffic routes can generally be established and the total failure of the traffic route and/or traffic routes primarily affected is avoided.

The invention then relates to a circuit arrangement of similar type and so to a circuit arrangement for centrally controlled telecommunication switching systems, in particular to PCM time-division multiplex telephone switching systems in which a central switching matrix serving for call interconnections together with a central processor serving, among other functions for its control, as well as for the required processing of switch identifiers is provided, and in which a multiplicity of local line trunk groups, each with a sub-switching matrix for the connection of external trunk and/or subscriber lines, and each with a local control unit are equipped for the reception of switch identifiers from these lines, for switch identifier pre-processing as well as for switch identifier forwarding to the central processor, and for the transmission of switch identifiers over these lines, and in which a sub-switching matrices in these line trunk groups are internally connected over groups of link lines, separated in groups, with switching matrix circuits of the central switching matrix, and in which the line trunk groups are allocated to each other in pairs, and in each of which line units, e.g. subscriber line circuits, multiple subscriber line circuits, trunk (-multiple-) termination circuits and the like, serving the connection to external subscriber and/or trunk lines are connected primarily with their sub-switching matrix, are switchable in a manner through which the line circuits of a respective first of these two trunk line circuits are additionally switched to the sub-switching matrix of the respective other, thus a respective second line trunk group, whereupon the connections for the corresponding switch identifier processing as well as for the setting of the sub-switching matrix interconnected via the switched over line units are likewise executed by the local control unit of the other, that is, the second line trunk group.

In a circuit arrangement of this type there is the problem that, as a rule, a large number of connections exist, i.e. connections from subscriber station to subscriber station that have already been interconnected and that these connections will be interrupted. This is not only very disturbing to the appertaining subscribers, but also severely taxing to the operation of the switching centers, since all of the interrupted connections must be newly established. The disturbing effect for the appertaining subscriber lies not only in the unanticipated and abrupt interruption of the on-going telephone conversation but also in that, due to such an interruption, connections that have been established for data transmission purposes, control purposes, monitoring purposes and the like may also be affected. A following re-establishment of each of these interrupted connections means that the appertaining switching systems, particularly the data processing, as well as the communication interconnection controlling, central and sub-central processors will be subject to a sudden overload.

An object of the invention is to provide means, in a circuit arrangement of the previously noted type, so that existing connections are not interrupted due to a switch-over that has become necessary—regardless of the cause—and to make unnecessary the re-establishment of the same together with the indicated negative consequences that occur, not only in the appertaining switching center, but in all connected affected switching centers in connection with such a switch-over.

The invention solves the problem posed in that, in preparation for a switch-over within each of these pairs in line trunk groups allocated to each other in pairs, each of the two appertaining local control units provides call data, relative to all existing calls via the respective allocated sub-switching matrix, regarding which external sub-switching matrix circuit is respectively connected with which internal sub-switching matrix circuit, which is transmitted via respective local transmission paths of the line trunk pairs to the respective corresponding associated control units, and that each of the local control units establishes individual partial connections in conjunction with these call data transmitted to and received by them, via the sub-switching matrix of the appertaining allocated line trunk group respectively between internal sub-switching matrix circuits and external sub-switching matrix circuits, i.e. such external sub-switching matrix circuits with which the line circuits of the respective associated line trunk groups are connectable through a switch-over on the one hand, and such internal sub-switching matrix circuits with which the line units of the respective associated line trunk group are connectable through this switch-over, on the other hand.

In the drawings, FIG. 1 and FIG. 2 illustrate an embodiment of the invention showing only those components contributing substantially to its understanding, but in no way limited to the same.

Before the description touches upon the significant characteristic features of the embodiment, the operating mode of a modern telephone switching center in which the invention is applied will be explained. The starting point of the description will be the time-division multiplex telephone switching system with PCM technology understood in the art as it is described abundantly and in detail in the technical literature, for example in the Journal "telecom report" mentioned further above. On page 19ff therein are described peripheral line trunk groups which are a part of this telephone switching system. As likewise shown in FIG. 1 on page 8 of this noted periodical, switching matrix (SN) and central processor (CP) are provided in duplicate, designated by "K1" and "K2" and by "ZW1" and "ZW2" in FIG. 1.

Figure 1:
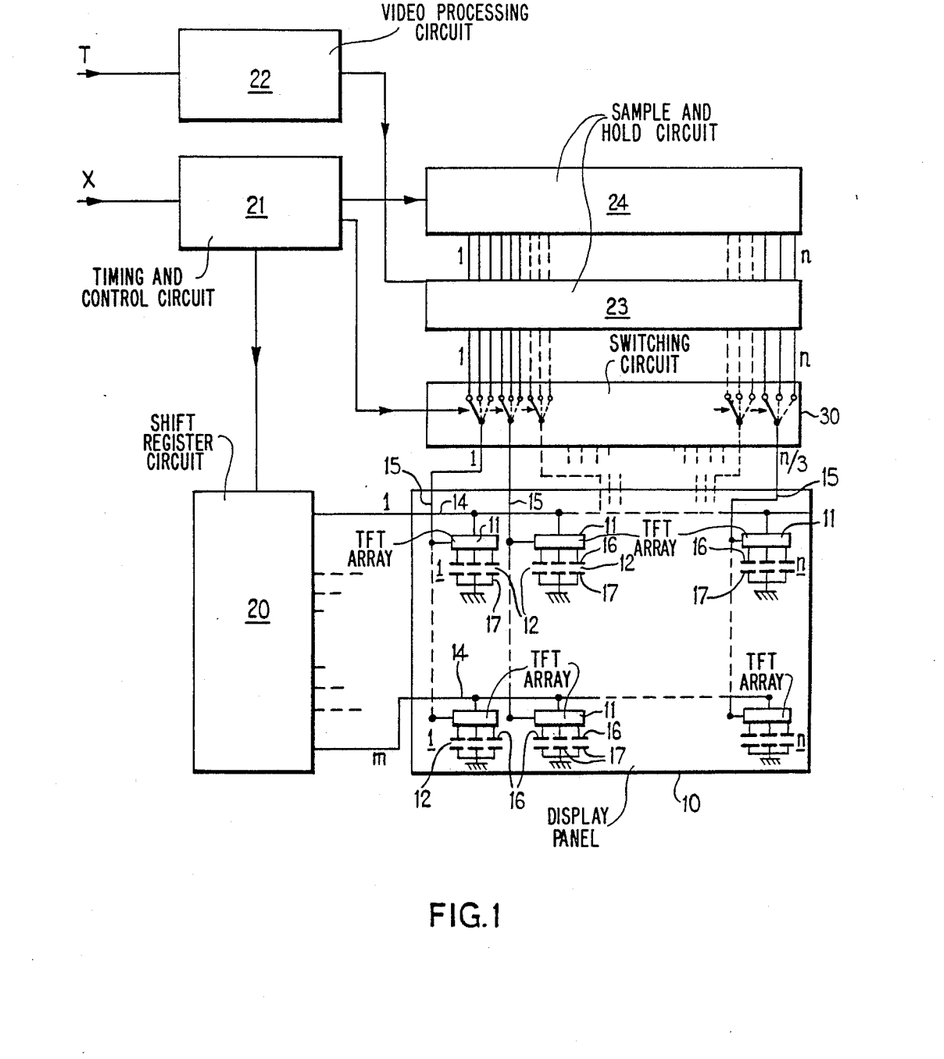
FIG. 1 shows in essence a telephone system of the type described in German Patent No. 3 128 365 (VPA 81 P 6257).

The drawing shows two line trunk groups LTG1 and LTG2 that are a part of a centrally controlled time-division multiplex telephone switching system based on PCM technology according to FIG. 1. They are connected to the central and doubled switching matrix K1/K2, having time-division multiplex inputs and time division multiplex outputs via time division multiplex lines L1/1, L2/1, and L1/2 and L2/2 according to FIG. 1 in a self-evident manner. Thereby each of these connections corresponding to this doubling of the switching matrix is a duplicate of the other. Each of these two time-division multiple lines provided per line trunk circuit, for example LTG1, has a large number, thirty for example, of channels for each of the two transmission directions and is accordingly connected with each time-division multiplex input as well as with each time-division multiplex output of these two switching matrices, as is shown in detail and described in the patent noted further above as well.

Furthermore as is shown in FIG. 1, a central processor ZW1 and/or ZW2 is provided for each of the paralleled switching matrices K1/K2 with the aid of which the entire control procedures for the establishment of connections via the respective central switching matrix K1 and/or K2 are accomplished in a manner understood in the art, through a buffer unit MB1/MK1 and-/or MB2/MK2 and a switching matrix setting unit KE1 and/or KE2 as is described in detail in the noted patent. For this purpose data is retrieved from the line trunk groups, e.g. from the line trunk groups LTG1 and others, via the central processor ZW1 and/or ZW2, as well as directed to these in opposite direction. At the same time local control units GP1, GP2 and similar others in the line trunk circuits cooperate in a manner understood in the art. The line trunk circuits and their integral line units are address selected for this data exchange.

Of the two central switching matrices K1 and K2 and the two central processors, one switching matrix, for example K1, and one central processor, for example ZW1, are respectively in service while the other switching matrix and the other processor are available in the event of a stand-by switch-over, if the need arises. Provisionally, in the interest of simplifying the further general description, discussion will be limited to the central switching matrix K1 and the central processor ZW1 only.

The data to be transmitted from the central processor ZW1 to the line trunk groups noted, which may also be retrieval instructions for the retrieval of data to be transmitted from the line trunk circuits and/or the line circuits to the central control unit, for example dialing data, is respectively prefixed with an appertaining line unit designated address. If but one line unit is to be selected from the central processor ZW1 for the transmission of data (retrieval instruction, if required) from the same to the former, it next transmits the address and the data in sequence to an input-output unit G1, (in "telecom report: IOP"). This unit then receives both and stores them.

As explained in the previously noted patent, data connections exist via one channel per time division multiplex line between the input-output unit G1 on the one hand and each of the trunk line circuits and their local control units, for example GP1, GP2, on the other, via the time division multiplex lines L1/1 and/or L2/1 as well as via the switching matrix K1 and by way of buffer units MB1/ML1. If now, the input-output unit has received data along with an address from the central processor ZW1 via the path z1, it directs a first element of the address to an address signal channel converter U1/U2. This first address element of the address corresponds to the respective line trunk circuit and therewith to its allocated data connection via buffer unit MB1 and switching matrix K1. The noted converter U11/U12 provides control data corresponding to the first part of the address which it sends to an electronic selector W1 which is set thereby to the appertaining signal channel (via the buffer MB1). The input-output unit G1 is thereby connected via the same to the local control unit, for example GP1, of the appertaining line trunk unit, for example LTG1, and now transmits to the same the complete address, i.e. including the first address element.

A large number of line trunk groups serving as termination of time-division multiplex trunk circuits allocated to different traffic routes are provided, of which the two line trunk groups LTG1 and LTG2 are shown in essence. Significant tasks and functions of these line trunk groups are described in great detail in the noted Journal and are assumed understood for the case at hand.

As is brought out further in the Journal noted, each of the line trunk groups respectively includes a number of line units. These serve in a manner understood in the art for the termination of subscriber circuits, trunk circuits or transmission systems with individually allocatable connecting channels. There are different types of line units, for example those for analog subscriber circuits, others for digital subscriber circuits, others for analog trunk circuits and the like. Likewise, there are line units which serve for the connection of a time-division multiplex trunk circuit, which as is known can encompass a large number, for example twenty or thirty, of individually allocatable PCM-channels. Involved here, strictly speaking, is one channel pair per connection, whereby one channel respectively is provided for one transmission direction and the other for the other transmission direction.

In the Journal noted, the purpose which the indicated line units serve is described in detail. In the case of analog subscriber circuits and/or analog trunk circuits a line unit is provided for a multiplicity of lines. Line units for time-division multiplex operated transmission systems that respectively encompass a larger number of channel pairs (see above) are so constructed that a transmission system with twenty-four or thirty channel pairs is connected to one line unit. In the Journal noted there is further disclosed, that in a line trunk circuit, which is arranged for time-division multiplex transmission systems, a total of four or five of such line units are provided. The Journal noted further indicates, that within a single line trunk circuit, line units connected to a time-division multiplex switching unit of the appertaining line trunk circuit are connectable via the same, with channels of the corresponding time-division multiplex input of the appertaining line trunk circuit and the corresponding time division multiplex output of the central switching matrix.

One factor among others, in the case of this numerical allocation, is the concern that the traffic loads on the various sub-interfaces of the circuit paths are as well matched as possible. In practical terms, this means that the number of channel pairs which include all line units of time-division multiplex trunk circuits PCM-transmission systems, to which each may be allocated a different traffic route, but which may also be allocated in two's or more respectively in common to one and the same traffic route is about equal to the number of channel pairs that, that time-division multiplex circuit encompasses, which connects the appertaining line trunk circuit with the central switching matrix. Thus the transmission systems 1u1 through 1u4 in FIG. 2 may have about the same number of channel pairs as the time division multiple line L1/1.

As has been explained, in the respective selection of a signal channel for the purpose of selecting the appertaining line trunk group, the indicated address as well as the data is transmitted over this signal channel. Address and data are transmitted via the time-division multiplex switching matrix unit mentioned, for example GS1, then to the appertaining local control unit, for example GP1. Through the address, and particularly through the second address element contained therein, the latter recognizes which of the respective data is to be forwarded to.

In the previously described context it was pointed out that the address element already mentioned further above, designates that line trunk group to which the address and data were transmitted in the manner described. The second address element now indicates which of the line units within the appertaining line trunk group, for example LTG1, is the one to which the appertaining data is to be forwarded. It is to be assumed, that this is the line unit 1DIU2. It is to be further assumed, that the appertaining line trunk group, for example LTG1 finds itself in the normal service state. In this case therefore the change-over switch 1d2 is the resting position shown in FIG. 1. It follows therefore that the line unit 1DIU2 is connected to the time division multiplex switching unit GS1 of the line trunk group LTG1 via the resting position of the change-over switch 1d2.

As previously explained, the local control unit GP1 has, along with the data, also received and stored in the buffer, the address comprising a first address element designating the line trunk group LTG1 and a second address element designating the line unit 1DIU2. Based on the first address element, the local control unit GP1 recognizes that the appertaining data is to be forwarded to a line unit belonging to the same line trunk group LTG1. Based on the second address element the local control unit GP1 recognizes that the data is to be forwarded to the line unit 1DIU2. On this basis the local control unit GP1 so controls the time division multiplex switching unit, that a transmission path interconnects the local control unit GP1 with the line unit 1DIU2 which thus leads over the resting position of the change-over switch 1d2.

Departing from what has been described previously, provision may also be made so that local control unit GP1, in the context indicated, does not also receive the data along with the appertaining address, but only the address itself, and that it establishes a direct transmission path for the data in conjunction with the same, from the signal channel leading over the time-division multiplex line L1/1 via the time division multiplex unit GS1 and the resting position of the change-over switch 1d2. Thus in this case, the address is received in the local control unit GP1 via the signal channel, and is employed for the establishment of a direct interconnection from the indicated signal channel to the appertaining line unit. Thus, in this case the buffering of the appertaining information in the local control unit GP1 becomes unnecessary.

Still to be explained in this connection, is the special emergency service situation. As has been previously mentioned, an emergency service situation due to a failure may be caused when the signal channel between a line trunk group and the central processor is unusable, or when the local control unit, for example GP2, and/or the time division multiplex switching unit, for example GS1, of the appertaining line trunk group does not exhibit the required functional capability. The central processor has the capability of recognizing this through the continuous execution of a monitoring procedure which is detailed in referenced Journal "telecom report", as well as in the German Patent No. 3 106 903. Should the central processor sense a service failure which involves the line trunk group, for example LTG2, the entire data exchange between the central processor ZW1 and the line units 2DIU1 through 2DIU4 from the line trunk group LTG2 affected by the service failure continues via the line trunk group LTG1 for the duration of the service malfunction. To this end, all change-over switches in the respective line trunk group LTG2 are changed over from their rest position to their operating position. This may follow in two ways. Provision may be made so that the service failure within the line trunk group affected by it is itself recognized. This may come about in that the constant monitoring of the total functional capability of each data exchange by the central processor serving the line trunk groups, in accordance with the last mentioned German Patent no longer occurs, and that this is sensed within the respective line trunk group. On this basis the mentioned actuation of the change over switches 2d1 through 2d4 within the appertaining line trunk group can itself be taken up through its local control unit, for example GP2. However it may also be arranged that central processor ZW1 identifies the respective service failure in the line trunk group LTG2 and that it transmits appropriate data regarding this to the local control unit GP1 of the paired line trunk group LTG1, and that this then transmit a command to the indicated four change-over switches in the line trunk group LTG2 for their actuation.

During the service malfunction affecting the line trunk group LTG2 the change-over switches 2d1 through 2d4 are thus actuated. Accordingly the line units 2DIU1 through 2DIU4 are connected with the time division multiplex switching unit GS1 of the line trunk group LTG1.

When the central processor ZW1 senses the functional disturbance affecting the respective line trunk group LTG2, it also senses that continuing data exchange with the appertaining line units 2DIU1 through 2DIU2 is to be developed via the signal channel of the line trunk group LTG1, so it also provides corresponding data to the address signal converter U11/U12, in the input-output G1. Through this data, the signal channel number related to the line units 2DIU1 through 2DIU4 in the line trunk group LTG2 is temporarily altered. In practical terms this means that for the duration of the service malfunction of the line trunk group LTG2, upon the selection of one of its line units, the address signal converter upon receiving an address having a first address element designating the line trunk group LTG2 sends control data over the control path u1 to the electronic selector W1 to ensure, in this case, that the signal channel of the line trunk group LTG1, rather than the signal channel of the line trunk group LTG2, is selected by the electronic switch W1. The central processor thus provides the address and the data for the selection of an appertaining line unit 2DIU1 through 2DIU2 in the service malfunction state of the line trunk group LTG2 in the same way as in the normal service state of LTG2. For the duration of the service malfunction in the line trunk group LTG2 the address signal channel converter U11/U12 determines that the signal channel of the line trunk group LTG1 is selected rather than its LTG2 signal channel. The re-routing of the data related to the service malfunction of LTG2 for its line units thus occurs in the input-output unit with the aid of the electronic selector W1 as a result of the temporary alteration of signal channel numbers stored in the address signal channel converter U11/U12, which are retrieved from it as control data in each case and forwarded for the control of the selector W1.

If data, together with its associated address, consisting of a first address element and a second address element is now sent to the line trunk group LTG1 as a result of a failure, although the appertaining data is intended for one of the line units 2DIU1 through 2DIU4, the local control unit GP1 senses through the first address element that the appertaining data is intended for a line unit of the respective other line trunk group. By means of the second address element this local control unit identifies the respective line unit for which the data is intended. On the basis of the first address element and on the basis of the second address element the local control unit GP1 sends the respective data on to that line unit of the other line trunk group LTG2 for which it is intended. For this purpose the local control unit GP1 interconnects a transmission path via the time-division multiplex unit GS1 over which the data is then transmitted. This occurs via a corresponding connection of the time division multiplex switching unit GS1 and the operated side of the appertaining change-over switch, for example 2d2. In this case too, the respective data may be stored in the buffer memory of the local control unit GP1 and then transmitted from there to the appertaining line unit, for example 2DIU2, or provision may be made in the manner described above, so that, in the case described here as well, a direct interconnecting path is formed from the signal channel leading through the time division multiplex line L1/1, through the change-over switch 2d2 in its operated position, to the line unit 2DIU2.

Data may be transmitted in the manner described above, from the central processor to each of the line units as well as in the opposite direction. In the latter case data transmitted from the central processor to the appertaining line unit may be a request, on the basis of which the transmitted and requested information is sent from the appertaining line unit to the central processor. Data transmission from line trunk unit to line trunk unit may ensue in the same manner as is described in the German Patent No. 3 128 365. Data from a line unit of a line trunk group may thus be transmitted to a line unit of another line trunk group in this manner, whereby these data need not be received by the central processor ZW1 itself, but rather upon arrival in the input-output unit G1 from a line unit, it will be directly transmitted to the appertaining line unit for which it is intended. This is made possible through the forwarding of data within the input-output unit G1 as described in the patent document last noted.

As is brought out in the preceding part of the description, a central switching matrix K1/K2, serving for interconnection switching is provided in duplicate. Likewise provided in duplicate is a central processor ZW1/ZW2, whereby the one switching matrix, for example K1 and the one central processor, for example ZW1 are allocated to each other, which also holds for the other switching matrix and the other central processor. Among other functions, the central processor serves in a manner understood in the art, for the control of its switching matrix as well as for the processing of the switch identifiers required for the purpose. Each of the two processors is program controlled in a manner understood in the art. The duplication of switching matrix and central processor serves in a known manner for the possibility of stand-by service. For the case of a functional disturbance and/or a switching system failure in one of the two switching matrices and/or in one of the two central processors and/or in one of their respective further allocated elements, the known possibility exists, that the switching service instead of continuing with the one central switching matrix, for example K1, and one of the two central processors, for example ZW1, will do so rather with the other of the two switching matrices, for example K2 and with the other of the two central processors, for example ZW2—and the other way around.

Figure 2:
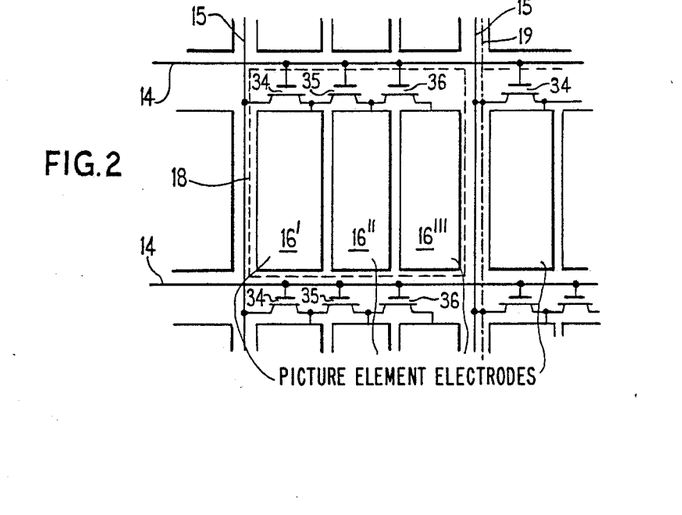
FIG. 2 shows additional details significant to the invention.
Figure 3A:
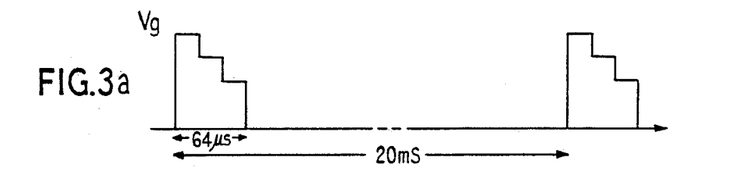
Figure 3B:
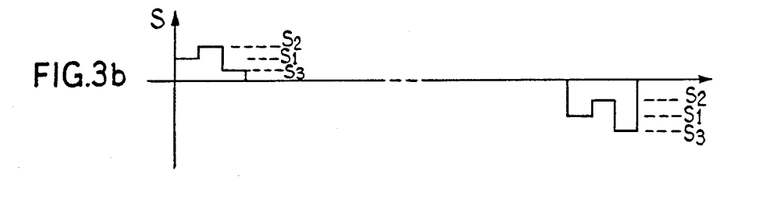
Figure 4:
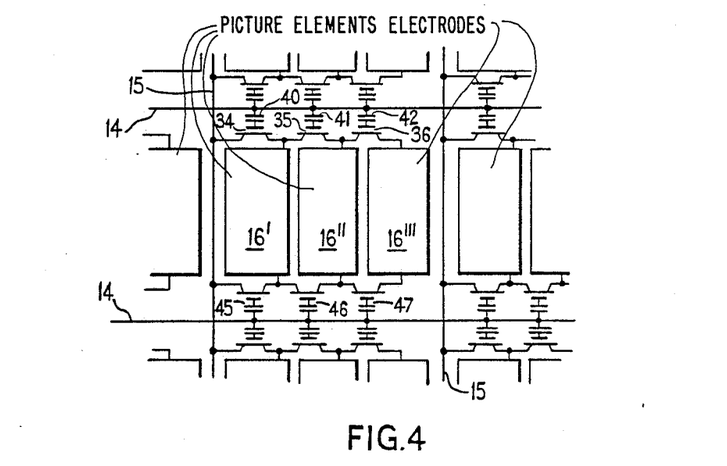
Figure 5:
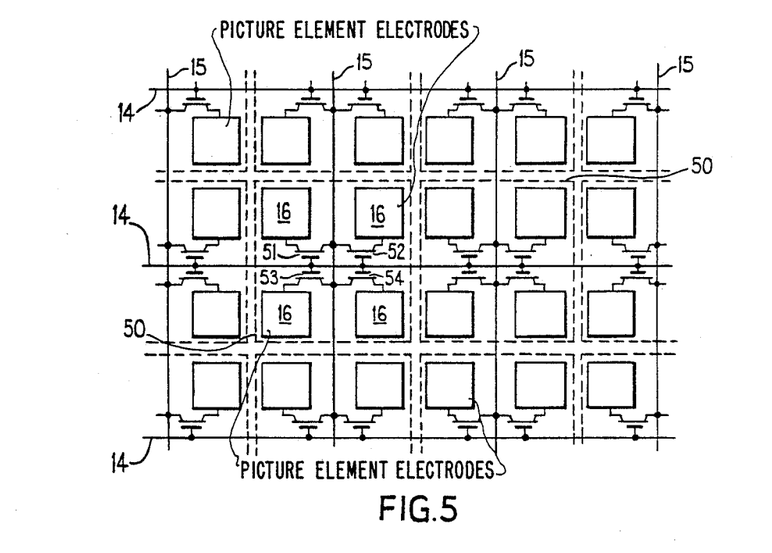

As has likewise already been explained—and as is also already known from the referenced section in the literature—a number of local line trunk groups are each equipped with a sub-switching matrix for the external connection of trunk and/or subscriber lines and corresponding channels, and with a local programmable control unit for the reception of switch identifiers from these lines, for switch identifier pre-processing and forwarding to the appertaining central processor and for the transmission of switch identifiers to the noted lines or channels. Thus for example, the line trunk group LTG1 exhibits the sub-switching matrix GS1 and the local control unit GP1. Connected externally to the sub-switching matrix GS1 are the units 1DIU1 through 1DIU4, which have already been mentioned further above. Internally the sub-switching matrix is connected to two time-division multiplex lines L1/1 and L1/2, which lead to the two central switching matrices K1 and K2. Each of these time-division multiplex lines encompasses a number, for example thirty, channel pairs, as has likewise been explained further above, whereby a respective channel pair contains a transmission channel in the one transmission direction and a transmission channel in the other transmission direction. Each of these channel pairs form a link line. Consequently, each sub-switching matrix, for example GS1, is connected via two groups of link lines, separated in groups, with switching matrix terminations of the one and of the other of the two parallel switching matrices.

It has likewise already been mentioned—and may also be gathered from the above sections of the literature noted further above—that for a data exchange, serving for the manipulation of switch identifiers, between the local control units on the one hand and the respective service-ready processor on the other, data connections are brought into service-ready state and/or maintained therein. In this switch identifier manipulation therfore, the dial information provided by subscribers as well as the switch identifiers arriving via the already established or partially established communication paths, which arrive over the local line trunk groups are directed to the respective central processor after a pre-processing by the respective local control unit, whereby the former processes setting data for its central switching matrix, as well as switch identifiers and control data, which are again directed to the respective local control unit via the appertaining connections and are transmitted from there, and/or for the connection of call progress tone signal, call signals and the like, for the appertaining subscribers. The data exchange serving for this switch identifier manipulation between each of the local control units on the one hand and the appertaining central processor on the other hand occurs via data connections which are established and continuously maintained in the service-ready state, between each of the local control units via the switching matrix in service and the respective service-ready processor. These data connections are established like message connections via the central switching matrix. They run in the already noted manner via the units MB1 and G1, insofar as the switching matrix K1 and the central processor are in service at the time.

The noted data connections between each of the local control units of each of the line trunk groups on the one hand, and the respective in-service central processor on the other, serve not only for the executed data exchange for the development of the noted switch identifier manipulation, but these data connections also serve so that during start-up of a central processor and its allocated central switching matrix this central processor transmits program and switching software to all local control units of all line trunk groups. This is also known as "Loading" and is described in detail in the already noted Journal "telecom report", Supplement 1981, particularly Page 19ff. Provided for this purpose, in the case of the presently described embodiment, is an input-output unit, for example G1 connected with the central processor, ZW1 for example, to which a number of data buffer memory units, for example MB1 are connected; a number of data connections lead from each of these to the local control units of the line trunk groups noted via the appertaining units of the line trunk groups noted via the appertaining switching matrix, for example K1. As with the link lines, these data buffer memories are individually directly connected to terminations of the switching matrix. As has been brought out, a link line and accordingly also a link circuit is respectively realized through a channel pair. The channel pairs belong to the time division multiplex lines connected to the switching matrix K1 and/or K2.

The technical switching system data required, and to be stored, in the local control unit, as for example, subscriber line status, subscriber call number allocation, subscriber listings and technical characteristics of connected trunk lines and the like, as well as program data which determines the development of the switching system functions, are now entered into corresponding memories of the two central processors and from there are transmitted to and stored in the local control units of the various line trunk groups upon the start-up of a central processor. This transmission and storage occurs individually for each line trunk group, i.e. individually and sequentially for the local control units of the various line trunk groups. The time consumed for this purpose, upon activation of a switching center, is vanishingly small in comparison to that required for the total activities of a switching center. However, this consumed time takes on a greater significance in the case of a stand-by service switch-over of the central processor and the central switching matrix. For this case, provision is also made to load the local control units of the line trunk groups with the switching system data and program data, in order to reliably insure fully synchronous operation between these data, which are thus stored in the central processor newly going into service on the one hand and the local control units on the other hand. By this means, all deviations (from synchronism) are excluded that might otherwise arise relative to these switching system data and these program data, that are thus stored in the central processor going into service on the one hand and in the local control units of each of the various line trunk groups on the other hand. Such deviations may, for example, result if modifications are made over a time interval in these switching system data and/or program data, or as a result of these data in the local control units having been subject to error due to certain disturbing effects. Such deviations are however safely excluded through a renewed loading of all local control units with the program and the switching system data in connection with the provided stand-by switch-over of the central processor newly going into service.

Now, in order to minimize the time required for the described loading of the program data and the switching system data into the local controllers of the various line trunk groups from the central processor newly going into service in connection with the stand-by switch-over, provision is made so that two line trunk groups are respectively allocated to each other, that in each of the same, line units serving for the external connection of subscriber and/or trunk lines and connected within the respective line trunk groups with their sub-switching matrix in normal service, are partially interchangeable during emergency service. Use is thus made of the technical procedure already described in detail further above, whereby the switch-over from normal service to emergency service is implemented in all line trunk groups. Thus, by this means, the line units of a respective first of two line trunk groups allocated together in pairs are additionally switched to a respective second line trunk group, which also occurs in the same manner in all line trunk groups allocated together in pairs. Thereby the corresponding switch identifier processing as well as the setting of the sub-switching matrix for the connections running via the switched-over line units is carried out by the local control unit of the respective other, thus second, line trunk group.

Thus, in this operating situation, only one of all of the line units, which may for example be subscriber line units, multiple subscriber line units, trunk line termination circuits, which may also be trunk line multiple termination units and the like, is served by the local control unit within two line trunk groups allocated to each other in pairs. In this operating situation also, all connections that are established over the line units of both line trunk circuits are interconnected via the sub-switching matrix of only one of the two line trunk groups. Thus it follows from this, that since in this operating situation the line units respectively of a first of these two line trunk groups are additionally switched to the sub-switching matrix of the respective other line trunk groups, the entire establishment of the connection occurs via the sub-switching matrix of the second line trunk group with the aid of its local control unit. Thereby the two line trunk groups are fully and equally enabled, i.e. this switch-over relative to these two line trunk groups may also follow in the reverse direction. The entire further development of the operation then follows in the same way as has been described in detail, further above, for emergency service. In this operating mode, all line trunk groups are in emergency service concurrently.

Upon the establishment of the emergency service state, half of all the local control units are removed from service as well as half of the sub-switching matrices, and respectively one local control unit and respectively that sub-switching matrix allocated to it per pair of trunk line groups.

The stand-by service switch-over of one of the two central processors by the respective other central processor is thus prepared during the on-going operation of the central processor that has been in service up to that time, by the transfer of all line trunk groups allocated to each other in pairs from normal service to emergency service. Furthermore, the other central processor establishes data connections to the local control groups of all first line trunk groups via the other central switching matrix allocated to it. This takes place in the manner already described further above. These connections are thus established to the local control units of all those line trunk groups, the line units of which have been switched over to the sub-switching matrix of the other line units allocated to each other in pairs, thus those line trunk groups whose local control units and whose sub-switching matrices have been withdrawn from normal switching service in connection with the stand-by service switch-over being prepared.

Via the previously described, newly established data connection, the central processor newly going into service in connection with the preceding stand-by service switch-over now loads the total program data and the total switching system data into the appertaining local control unit and the corresponding memory of the same. This central processor thus transmits to the respective local control units, which have been withdrawn from regular switching service for the time being, in continuous sequence, the program and switching software required for their renewed start-up, and storage in the same. This occurs on the part of the already prepared central processor, going into service in connection with the preceding stand-by service switchover, during a transition period in which the other central processor is still engaged in switching service with those local control units and sub-switching matrices which have been transferred from normal service to emergency service for the preparation of the intended alternate circuit for this purpose.

When the presently described procedures for the loading of program data and switching system data for the preparation of stand-by service switch-over have been completed, the stand-by switch-over occurs. Thereby the entire central data preparation and control functions are transferred from the one central processor to the other central processor, in a manner known in the art, whereby the one central switching matrix is also replaced by the other central switching matrix. Provision may thereby be made so that already existing connections can remain intact until their release. All new connections are then established with the aid of the newly loaded local control unit, and via the respective sub-switching matrices allocated to them. The other local control units and their allocated sub-switching matrices are no longer employed for the establishment of additional connections. A switch-over then follows within the line trunk groups with the aid of the change-over contacts 1d1 through 1d4 shown in FIG. 2. Thus at the same time, the switching service continues with the aid of those local control units that had been removed from the normal switching service prior to the completed stand-by service switch-over, and via the allocated sub-switching matrices. Those local control units and allocated sub-switching matrices, which have carried out the switching service in quasi-emergency operation up to the time of the stand-by switch-over now go out of service. Thereafter however, the central processor that has gone into service in connection with the stand-by service switch-over also sequentially establishes data connections to all those local control units, which have now gone out of service in connection with the stand-by service switch-over that has ensued. In addition, the central processor also loads the necessary program data and switching data into the memory of those local control units. This occurs over a period of time spread throughout the normal switching procedures. After the central processor has loaded all the local control units with the necessary program data and the appertaining switching system data, the operating mode of the line trunk groups allocated to each other in pairs is successively returned again in sequence from emergency service to normal service.

Now that the description of the embodiment of the invention, shown in abstract in the Figures, of a time division multiplex switching system in which the invention is applied, has been treated in general terms, it turns to the particular aspects significant to the invention.

As has already been detailed, a switch-over is provided within a line trunk group pair during emergency service. It was explained, in connection with this switch-over, that upon the appearance of a failure, for example in the line trunk group LTG2 (in its sub-switching matrix or in its local control unit), the line units, for example 2DIU1 through 2DIU4, of this line trunk group are switched over to the sub-switching matrix, for example GS2 of the line trunk group affected by the failure, for example LTG2, to the sub-switching matrix, for example GS1, of the associated line trunk group, for example LTG1 with the aid of the appertaining change-over switches 2d1 through 2d4. Such a switch-over can not only be implemented in emergency service caused by a failure of the type described respectively above, or for only one line trunk group pair (LTG1/LTG2), but for all existing line trunk group pairs, and for the preparation of a stand-by service switch-over of one of the central processors through the respective other central processor, previously described in detail. As already detailed further above the change-over switches LH1, LH2, LG1 and LG2 are activated upon such a stand-by service switch-over. If the central processor ZW1 is in service, these change-over switches are in their position shown in FIG. 2. If the central processor ZW1 is in service, the latter noted change-over switches are, in this context, in their respective other switching position. The situation is thereby achieved in which the sub-switching matrices GS1 and GS2 are connected either with the central switching matrix K1 or with the central switching matrix K2.

The switch-over thus relates to the line units, for example, 2DIU1 through 2DIU4 among others, of that line trunk group, for example LTG2, in which a service failure has occurred, in its sub-switching matrix, for example GS2, or local control unit, for example GP2. To that extent this switch-over relates to the connecting paths between the line units and the external sub-switching matrix circuits. Beyond that, however, this switch-over also affects the internal sub-switching matrix circuits. In the context of such a switch-over, the connections between the sub-switching matrices GS1 and GS2 and the time-division multiplex lines L1/1 through L2/2 are also switched over in the manner shown in the drawing with the aid of the change-over switches u11, u12, u21 and u22. These latter noted change-over switches are shown in that switching position which they assume during normal service. In the event that the change-over switches 2d1 through 2d4 become activated and that they isolate the line units 1DIU1 through 2DIU4 from the external connections of the sub-switching matrix GS2, to connect them with the external connections of the sub-switching matrix GS1, the change-over switches u21 and u22 within the line trunk group 1TG2 are also activated. Through the time-division multiplex lines L2/1 and L2/2 which lead to the line trunk group LTG2, in whose time-division multiplex (termination) circuit LU2, the time-division multiplex line L2/1 leading to the respective in-service processor e.g. ZW1 is switched over with the result that this time-division multiplex line henceforth is no longer connected with the sub-switching matrix GS2 (via LH2-resting side) but rather with sub-switching matrix GS1 (via LG1-resting side), whereby in this service mode, it is determined with the aid of the additional change-over switch LG1, whether this switched-over connection is a time-division multiplex connection to the central switching matrix K1 or to the central matrix K2; thus to the central switching matrix K1 in the service situation presently addressed.

Thus, when a sub-switching matrix is switched over, this affects the external sub-switching matrix circuits as well as the internal sub-switching matrix circuits. Through a switch-over in a line trunk group, e.g. LTG2, its lines units, e.g. 2DIU1 through 2DIU4, as well as its time-division multiplex connecting lines, e.g. L2/1 and L2/2, from the sub-switching matrix, e.g. GS2, of the appertaining line trunk group LTG2 to the sub-switching matrix, e.g. GS1, of the respective associated line trunk group LTG1, are switched over. This switch-over may be implemented in the case of a failure in order to nullify the effect of the appertaining failure in a single line trunk group pair, for one of its two line trunk groups, or likewise in the case of a number of line trunk groups affected by failure, or for the purpose of preparing the above processor stand-by service switch-over in all line trunk pairs simultaneously.

As is shown in FIGS. 1 and 2 of the drawing, a call data memory is allocated to each of the local control units GP1 and GP2. In addition a transmit and receive unit GA1 and/or GA2 is individually allocated to these control units. These are interconnected via a local data transmission path GL1/2. Via this path, the two local control units may exchange call data with each other with the aid of the noted transmit and receive units. They may also have the task of buffer storage in connection with the respective transmission procedure.

Provision is now made so that each local control unit stores call data regarding each existing call from subscriber station to subscriber station in its call data memory. Provision may also be made so that call data of such calls as are still in the state of being established are also stored, or only such calls that have been interconnected from subscriber to subscriber which the respective called subscriber has not yet answered.

The call data which are stored in the call data memory, indicate relative to the existing calls, via the allocated sub-switching matrix, which external sub-switching matrix circuit is connected with which internal sub-switching matrix circuit. The "allocated" sub-switching matrix is thus respectively that one which belongs to the same line trunk group as the appertaining local control unit and its call data memory. Since each call from one subscriber location to another subscriber station is always interconnected via a sub-switching matrix of the respective central switching matrix and again via a sub-switching matrix, two connections respectively within one or each sub-switching matrix are always associated with an interconnected call from one subscriber station to another subscriber station. These connections may also be designated as "partial connections." It is thus provided, that during normal switching service, the call data of those calls are stored in each line trunk group, that are directed over the respective sub-switching matrix.

In addition, provision is made so that the local control units which belong to one pair of line trunk groups exchange the call data of all interconnected calls with each other. The local control unit GP2 transmits the call data of all calls, that are thus interconnected via the sub-switching matrix, e.g. GS2, from its call memory GR2, to the sub-switching matrix GP1 and oppositely. The latter stores the call data received from its associated control unit in its respective call memory, and moreover, each local control unit, with the aid of the respective call data received from its associated control unit, interconnects calls ("partial connections", see above) within that sub-switching matrix that belongs, together with it, to the same line trunk group.

Provision may be made, in this connection, so that the call data from each of the local control units are transmitted during on-going switching service, and that each of the two local control units establishes the appertaining partial connections continuously, on the basis of these call data. In a departure from this, provision may also be made so that each of the two local control units stores the appertaining call data allocated to its sub-switching matrix for itself, and that these are transmitted from each of the two local control units respectively to its associated control unit on the basis of a switch-over preparation identifier, and that each of the two local control units establishes the appertaining partial connection on the basis of the transmitted call data. However, it may likewise be provided that, each of the two local control units stores the appertaining call data allocated to its sub-switching matrix for itself, and that these are continuously transmitted from each of the two local control units respectively to its associated control unit, and that each of the two local control units, on the basis of these stored and transmitted call data, and on the basis of a switch-over preparation identifier, establishes the appertaining partial connection.

Thus in this manner, calls are interconnected in each sub-switching matrix during normal switching service via the subscriber station over which the appertaining subscribers may communicate, as well as calls between external and internal sub-switching matrix circuits, which are not employed during normal switching service. These connections run from external sub-switching matrix circuits, e.g. the sub-switching matrix GS1, that are in the respective other line trunk circuit, e.g. LTG2, with the operated sides of the, e.g. change-over switches 2d1 through 2d4, to internal sub-switching matrix circuits that are connected to operated sides of the change-over switches u21 and u22 and/or u11 and u12 via the change-over switch LG1 and/or LG2. All of these change-over switches are designed as electronically operated switches for this purpose in a manner understood in the art.

If now the local control unit and the sub-switching matrix of a line trunk group is removed from service, then in the course of the accomplishment of this switch-over, the line units of this line trunk group on the one hand, and the time-division multiplex lines that run from this line trunk group to the central (doubled) switching matrix on the other, are switched over to the sub-switching matrix of the respective associated line trunk group with the aid of the described change-over switches, e.g. 2d1 through 2d4 and u21 and u22, and thus to those external and internal sub-matrix switching circuits between which the already previously described sub-switching matrix connections ("partial connections", see above) that have not been in use until they have been established in preparation. The result achieved in this manner is that in the course of the switch-over of the kind last described, calls already interconnected from subscriber station to subscriber station need not be interrupted.

Thus call data is transmitted from each of the two local control units belonging to a pair of line trunk groups, via respective local individual transmission paths of the line trunk group pairs to the respective corresponding associated control unit. Each of the two local control units establishes connections via the sub-switching matrix of the respective allocated line trunk group with the aid of these transmitted call data that have been received by it, and so to external sub-switching matrix circuits with which the line units of a first line trunk group are connectable to the sub-switching matrix of a second line trunk group through the switch-over.

When a switch-over has occurred in this manner in all line trunk groups, and for the purpose of preparation of a stand-by service switch-over, only one local control unit, e.g. GP1, and a sub-switching matrix, e.g. GS1, respectively in all line trunk groups is operational for the development of the switching service of both line trunk groups. In this exemplary case the change-over switches 2d1 through 2d4 and u21 and u22 are in their operated state. It was further assumed above that the switching service is now developed with the central processor ZW1 via the central switching matrix K1. Therefore the change-over switches LH1, LH2, LG1, Lg2 are in their non-operated state shown. In this service situation—as is evident from FIG. 2—the result of the switch-over is that the time-division multiplex line L2/1 of the line trunk group LTG2 is connected via the change-over switch u21 and the non-operated side of the change-over switch LG1 with the sub-switching matrix GS1 of the line trunk group LTG1.

Additionally, in this service situation, the time-division multiplex line L2/2 is connected via the operated side of the change-over switch u22 and the non-operated side of the change-over switch LH2 with the sub-switching matrix GS2 of the same line trunk group and is connectable via this, within the local control unit GP2. The data loading procedure of program data and technical switching data for these control units occurs over this path in preparation for the standby service switch-over already described in detail above.

We claim:

1. A circuit arrangement for centrally controlled telecommunication switching systems, including PCM-telephone switching systems wherein a central switching matrix serving for the interconnection, together with a program controlled central processor serving, at least, for its control and the required switch identifier processing, and wherein a multiplicity of local trunk line groups, each group with a sub-switching matrix for the connection of external trunk and/or subscriber lines, and equipped with a local programmable control unit for the reception of switch identifiers from said lines, for switch identifier pre-processing as well as for forwarding switch identifiers to the central processor and for the transmission of switch identifiers on said lines is provided, and wherein sub-switching matrices within these trunk line groups are internally connected via groups of link lines, separated in groups, with switching terminations of the central switching matrix, and wherein the line trunk groups are allocated to each other in pairs, wherein line units, primarily connected to their sub-switching matrix and within the respective line trunk group serving for the external connection of subscriber and/or trunk lines, are switchable in a manner wherein the line units of respectively a first of these two line trunk groups is additionally switched to the sub-switching matrix of the respective other, of a respective second line trunk group, whereupon the corresponding switch identifier processing as well as the sub-switching matrix setting for the calls to be interconnected via the switched-over line units is likewise executed by the local control unit of the other, second line trunk group, characterized in that, in preparation for a switch-over within each of said pairs of line trunk groups allocated to each other in pairs, each of the two appertaining local control units provide call data, relative to all existing calls via the respective allocated sub-switching matrix, regarding which external sub-switching matrix circuit is respectively connected with which internal sub-switching matrix circuit, which are transmitted via respective local transmission paths of the line trunk pairs to the respective corresponding associated control units, and that each of the local control units establishes individual partial connections in conjunction with said call data transmitted to and received by them via the sub-switching matrix of the appertaining allocated line trunk group respectively between internal sub-switching matrix circuits and external sub-switching matrix circuits, wherein such external sub-switching matrix circuits with which the line circuits of the respective associated line trunk groups are connectable through a switch-over on the one hand and such internal sub-switching matrix circuits with which the line units of the respective associated line trunk group are connectable through said switch-over, on the other hand.

2. A circuit arrangement according to claim 1 wherein the call data from each of the two local control units are respectively transmitted to its associated control unit during on-going switching service, and wherein each of the two local control units establishes the appertaining partial connections on the basis of said call data continuously.

3. A circuit arrangement according to claim 1 wherein each of the two local control units stores for itself the call data appertaining to its respectively allocated sub-switching matrix, and wherein said call data are transmitted from each of the two local control units respectively to its associated local control unit on the basis of a switch-over preparation identifier, and wherein each of the two local control units establishes the appertaining partial connections on the basis of said stored, transmitted call data.

4. A circuit arrangement according to claim 1 wherein each of the two local control units stores for itself the call data appertaining to its respectively allocated sub-switching matrix, wherein said data are continuously transmitted from each of the two local control units to its associated control unit, and wherein each of the local control units establishes the appertaining partial connections on the basis of said stored, transmitted call data and on the basis of a switch-over preparation identifier.

5. A circuit arrangement for centrally controlled telecommunicating switching systems, including PCM-telephone switching systems wherein a central switching matrix serving for the interconnection, together with a program controlled central processor serving, at least, for its control and the required switch identifier processing, and wherein a multiplicity of local trunk line groups, each group with a sub-switching matrix for the connection of external trunk and/or subscriber lines, and equipped with a local programmable control unit for the reception of switch identifiers from said lines, for switch identifier pre-processing as well as for forwarding switch identifiers to the central processor and for the transmission of switch identifiers on said lines is provided, and wherein, in said trunk line groups sub-switching matrices are internally coupled to switching terminations of the central switching matrix by way of groups of link lines separated into groups; wherein the trunk lines are respectively allocated to each other in pairs, and wherein within each of the same, termination units, being any of subscriber line circuits, multiple subscriber line circuits, trunk line termination circuits, trunk line multiple termination circuits, serving for the external connection of subscriber and/or trunk lines and primarily coupled to their respective switching matrix, are switchable in a manner such that the line units of respectively a first of these two line trunk groups is additionally switched to the sub-switching matrix of the respective other, of a respective second line trunk group, whereupon the corresponding switch identifier processing as well as the sub-switching matrix setting for the calls to be interconnected via the switched-over line units is likewise executed by the local control unit of the other, second line trunk group, characterized in that, in preparation for a switch-over within each of said pairs of line trunk groups allocated to each other in pairs, each of the two appertaining local control units provide call data, relative to all existing calls via the respective allocated sub-switching matrix, regarding which external sub-switching matrix circuit is respectively connected with which internal sub-switching matrix circuit, which are transmitted via respective local transmission paths of the line trunk pairs to the respective corresponding associated control units, and that each of the local control units establishes individual partial connections in conjunction with said call data transmitted to and received by said control units via the sub-switching matrix of the appertaining allocated line trunk group respectively between internal sub-switching matrix circuits and external sub-switching matrix circuits, wherein such external sub-switching matrix circuits with which the line circuits of the respective associated line trunk groups are connectable through a switch-over on the one hand and such internal sub-switching matrix circuits with which the line units of the respective associated line trunk group are connectable through said switch-over, on the other hand.

6. A circuit arrangement according to claim 5 wherein the call data from each of the two local control units are respectively transmitted to its associated control unit during on-going switching service, and wherein each of the two local control units establishes the appertaining partial connections on the basis of said call data continuously.

7. A circuit arrangement according to claim 5 wherein each of the two local control units stores for itself the call data appertaining to its respectively allocated sub-switching matrix, and wherein said call data are transmitted from each of the two local control units respectively to its associated local control unit on the basis of a switch-over preparation identifier, and wherein each of the two local control units establishes the appertaining partial connections on the basis of said stored, transmitted call data.

8. A circuit arrangement according to claim 5 wherein each of the two local control units stores for itself the call data appertaining to its respectively allocated sub-switching matrix, wherein said call data are continuously transmitted from each of the two local control units to its associated control unit, and wherein each of the local control units establishes the appertaining partial connections on the basis of said stored, transmitted call data and on the basis of a switch-over preparation identifier.

9. A circuit arrangement for centrally controlled telecommunicating switching systems, particularly PCM-telephone switching systems in which a central switching matrix serving for the interconnection, together with a program controlled central processor serving, at least, for its control and the required switch identifier processing, and wherein a multiplicity of local trunk line groups, each with a sub-switching matrix for the connection of external trunk and/or subscriber lines, and equipped with a local programmable control unit for the reception of switch identifiers from said lines, for switch identifier pre-processing as well as for forwarding switch identifiers to the central processor and for the transmission of switch identifiers on said lines is provided, and wherein, in said trunk line groups sub-switching matrices are internally coupled to switching terminations of the central switching matrix by way of groups of link lines separated into groups; wherein the trunk lines are respectively allocated to each other in pairs, and wherein termination units serving for the external connection of subscriber and/or trunk lines and primarily coupled to their respective switching matrix, are switchable in a manner such that the line units of respectively a first of these two line trunk groups is additionally switched to the sub-switching matrix of the respective other, of a respective second line trunk group, whereupon the corresponding switch identifier processing as well as the sub-switching matrix setting for the calls to be interconnected via the switched-over line units is likewise executed by the local control unit of the other, second line trunk group, characterized in that, in preparation for a switch-over within each of said pairs of line trunk groups allocated to each other in pairs, each of the two appertaining local control units provide call data, relative to all existing calls via the respective allocated sub-switching matrix, regarding which external sub-switching matrix circuit is respectively connected with which internal sub-switching matrix circuit, which are transmitted via respective local transmission paths of the line trunk pairs to the respective corresponding associated control units, and that each of the local control units establishes individual partial connections in conjunction with said call data transmitted to and received by said local control units via the sub-switching matrix of the appertaining allocated line trunk group respectively between internal sub-switching matrix circuits and external sub-switching matrix circuits, wherein such external sub-switching matrix circuits with which the line circuits of the respective associated line trunk groups are connectable through a switch-over on the one hand and such internal sub-switching matrix circuits with which the line units of the respective associated line trunk group are connectable through this switch-over, on the other hand.

10. A circuit arrangement according to claim 9 wherein the call data from each of the two local control units are respectively transmitted to its associated control unit during on-going switching service, and wherein each of the two local control units establishes the appertaining partial connections on the basis of these call data continuously.

11. A circuit arrangement according to claim 9 wherein each of the two local control units stores for itself the call data appertaining to its respectively allocated sub-switching matrix, and wherein these are transmitted from each of the two local control units respectively to its associated local control unit on the basis of a switch-over preparation identifier, and wherein each of the two local control units establishes the appertaining partial connections on the basis of these stored, transmitted call data.

12. A circuit arrangement according to claim 9 wherein each of the two local control units stores for itself the call data appertaining to its respectively allocated sub-switching matrix, wherein these are continuously transmitted from each of the two local control units to its associated control unit, and wherein each of the local control units establishes the appertaining partial connections on the basis of these stored, transmitted call data and on the basis of a switch-over preparation identifier.

* * * * *